United States Patent [19]
Baer et al.

[11] Patent Number: 5,635,779
[45] Date of Patent: Jun. 3, 1997

[54] ELECTRICAL MACHINE WITH AN AXIAL FAN

[75] Inventors: Jurgen Baer, Magenwiil; Hans Zimmermann, Monchaltorf, both of Switzerland

[73] Assignee: Asea Brown Boveri AG, Baden, Switzerland

[21] Appl. No.: 437,679

[22] Filed: May 9, 1995

[30] Foreign Application Priority Data

May 9, 1994 [DE] Germany ............... 44 16 299.5

[51] Int. Cl.$^6$ ................................................ H02K 9/00
[52] U.S. Cl. .................... 310/62; 310/58; 310/59
[58] Field of Search .......................... 310/52, 54, 58, 310/59, 62, 63, 64, 65

[56] References Cited

U.S. PATENT DOCUMENTS

| | | | |
|---|---|---|---|
| 4,210,833 | 7/1980 | Neveux | 310/58 |
| 4,684,835 | 8/1987 | Kline, Jr. et al. | 310/59 |
| 4,827,166 | 5/1989 | Morrill | 310/88 |
| 4,859,887 | 8/1989 | Carlsson et al. | 310/59 |
| 4,959,571 | 9/1990 | Yasumoto et al. | 310/67 R |
| 5,243,244 | 9/1993 | Kasberger et al. | 310/88 |
| 5,296,769 | 3/1994 | Havens et al. | 310/90 |
| 5,394,041 | 2/1995 | Oberdorfer-Bogel | 310/64 |

FOREIGN PATENT DOCUMENTS

| | | |
|---|---|---|
| 0279064 | 5/1992 | European Pat. Off. . |
| 1094353 | 12/1960 | Germany . |

Primary Examiner—Steven L. Stephan
Assistant Examiner—Michael Wallace, Jr.
Attorney, Agent, or Firm—Oblon, Spivak, McClelland, Maier & Neustadt, P.C.

[57] ABSTRACT

In gas-cooled electrical machine with an axial fan (9) at one shaft end and with a rotor (1) and a stator body surrounded by a machine housing (14), a gas-guide device (18) arranged coaxially to the rotor shaft is provided in the outflow space (17) of the axial fan (9), out of which gas-guide device the cooling gas conveyed by the axial fan is fed to the rotor and to the stator body and stator winding. Said gas-guide device (18) comprises a plurality of guide rings (19–25) in the form of a cone envelope and spaced radially from one another and a ring part (27) likewise in the form of a cone envelope, which rings and ring part are connected to one another and to the machine housing (14) directly, or indirectly by means of bars (28, 29) extending essentially radially and/or guide plates (36, 36'). Ring-shaped channels ($K_1, \ldots, K_8$) widening continuously in the direction of flow of the cooling gas are formed between respective radially adjacent guide rings, and between the ring part (27) and its adjacent guide ring.

The gas-guide device (18) brings about a pressure transition, and it reduces the outlet losses downstream of the latter in relation to the hitherto conventional axial outlet provided by the rotor configuration. Between 15% and 25% of the pressure losses in the machine can be saved in this way and consequently the cooling effect can be greatly increased.

20 Claims, 3 Drawing Sheets

ELECTRICAL MACHINE WITH AN AXIAL FAN

BACKGROUND OF THE INVENTION

1. Field of the Invention

The invention relates to an electrical machine with an axial fan at one shaft end, with a rotor and a stator body which is surrounded by a machine housing and which is provided with a stator winding having winding heads on the two end faces of the stator-body, with an inflow space of the axial fan, formed essentially by the end wall of the machine housing and by a partition wall between the winding head and said end wall, and with an outflow space of the axial fan, out of which the cooling gas advanced by the axial fan is fed to the rotor and to the stator body and stator winding.

The invention refers to a state of the art such as emerges, for example, from EP-A-0,279,064 and from U.S. Pat. No. 4,876,470 of identical content.

2. Discussion of Background

With an increasing mass of material to be cooled, the cooling demand in a rotating electrical machine increases appreciably. This applies particularly to gas-cooled turbogenerators and to an even more significant extent to turbogenerators with an indirectly cooled stator winding. In these machine types, the dissipative heat generated in the stator winding has to be diverted through the winding insulation into the cooled sheet-metal stator body.

The generation of pressure in gas-cooled turbogenerators usually is accomplished by means of axial fans. For the purpose of an increase in pressure, multistage compressors are ruled out for reasons of space. Also, on account of the conditions of installation and assembly, the incorporation of upstream or downstream distributors has hitherto been avoided.

SUMMARY OF THE INVENTION

Accordingly, one object of the invention is to increase the cooling effect in a simple and economical way, without lowering the efficiency of the machine.

This object is achieved, according to the invention, in that there is provided in the outflow space of the axial fan a gas-guide device which is arranged coaxially relative to the rotor shaft and which comprises a plurality of guide rings in the form of a cone envelope and radially spaced from one another and a ring part likewise in the form of a cone envelope, which are connected to one another and to the machine housing directly, or indirectly by means of bars or guide plates extending essentially radially, and in that ring-shaped channels widening continuously in the direction of flow of the cooling gas are formed between respective radially adjacent guide rings.

The effect of this gas-guide device in the winding-head space can be compared with that of so-called outlet diffusors which consist of subdivided annular guide blades and which were used years ago in the region of the exit of large wind tunnels (see the book by Bruno Eck, "Technische Strömungslehre" ("Engineering Fluid Mechanics"), pub. Springer-Verlag, Berlin/Heidelberg/New York, 1966, pages 186 and 187, especially FIG. 176 on page 187. It brings about a marked increase in pressure in the winding-head space, the result of this being that more cooling gas per unit time flows through the cooling channels in the rotor and stator.

Furthermore, the dynamic pressure at the outlet of the axial fan is reduced, that is to say the outlet loss decreases. With the fan being the same, between 15 and 25% of the pressure loss in the machine as a result of the pressure transitions can be avoided in this way.

The invention and further advantages attainable thereby are explained in more detail below by means of an exemplary embodiment illustrated in the drawing.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein:

FIG. 5 shows a simplified representation of two guide plates or different configurations; in the ring-shaped channels of the gas-guide device according to FIG. 1.

DESCRIPTION OF THE PREFERRED EMBODIMENT

Figure 1:
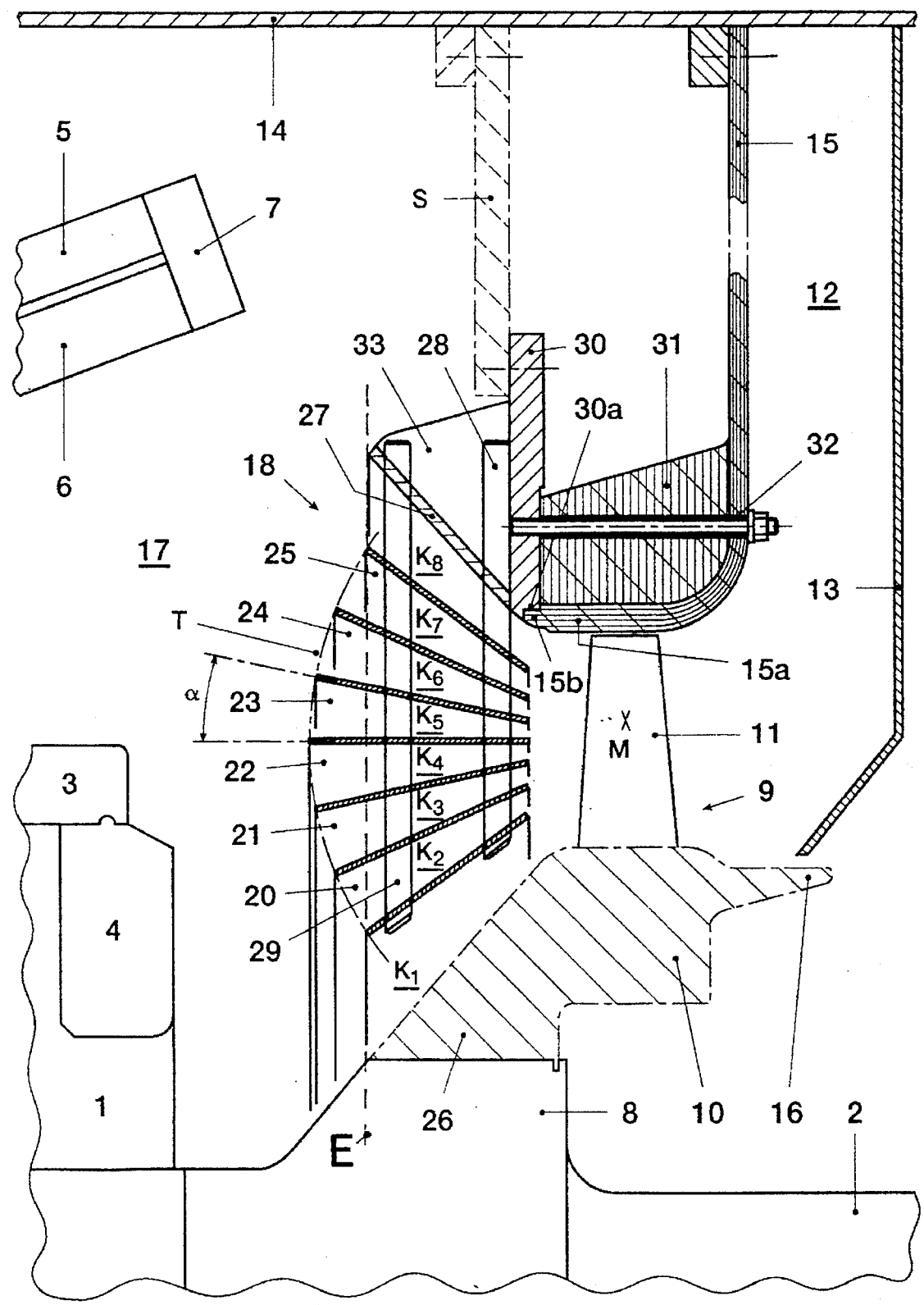
FIG. 1 shows a simplified longitudinal section through an end part of the turbogenerator with an axial fan and with an associated gas-guide device.

Referring now to the drawing, wherein like reference numerals designate identical or corresponding parts throughout the several views, in the simplified longitudinal section through the non-drive-side end part (NS side or exciting side) of a turbogenerator according to FIG. 1, the reference numeral 1 denotes a rotor, 2 its shaft, 3 the rotor cover and 4 its cover plate. The stator winding, of which only the end yokes can be seen, has a lower bar 5 and an upper bar 6 which are connected electrically and mechanically by means of lugs ("ear members") 7. All the end yokes form in their entirety the winding head.

Fastened on a shaft collar 8 of the rotor shaft 2 is an axial fan 9. Its hub is designated by 10 and its moving blades by 11. Its inflow space 12 is formed by the end face 13 of the machine housing 14 and a partition wall 15 made from glass-fiber-reinforced plastic or another material. This partition wall 15 (fan casing) is releasably fastened to the machine housing 14 on its (wall 15's) radially outward part, and extends radially inward, then bends in the axial direction and reaches axially behind the axial fan 9. The inflow space 12 is sealed off relative to the outside world by means of an axially pointing annular projection 16 having a rounded edge, on the fan hub 10. The design of the end part of the electrical machine corresponds thus far to the state of the art.

According to the invention, to increase pressure, there is provided in the outflow space 17 (winding-head space) of the axial fan 9 a gas-guide device which is designated as a whole by the reference numeral 18. It is arranged coaxially relative to the rotor shaft and has a plurality of, in the example seven guide rings 19 to 25 in the form of a cone envelope and spaced radially from one another, the middle guide ring 22 being cylindrical (=borderline case of conical). With an even number of guide rings and the geometry of FIG. 1, the two middle guide rings would both be in the form of a cone envelope. The hub end 26 of the fan hub 10 also comprises part of the guide device, said hub end 26 narrowing conically towards the machine center; and a ring part 27 in the form of a cone envelope which virtually seamlessly adjoins the inner end 15a of the partition wall 15 further comprises part of the guide device. The outlet region of the axial fan 9 is thereby divided into a plurality of ring-shaped channels $K_1, \ldots, K_8$ widening continuously in the direction of flow of the cooling gas and having an aperture angle alpha ($\alpha$) of preferably $\alpha \leq 12°$, which each independently form a diffuser and in their entirety a "multi-diffuser". In order to obtain approximately identical channel lengths, the axial lengths or, more precisely, the lengths of the generatrices of the guide rings 19 to 25 in the form of a cone envelope are selected so that their inner ends form a torus surface segment T. The generatrix of this torus is a circle, of which the center point $M_T$ lies on a circle which is coaxial to the rotor shaft 2 and which passes approximately through the radial center of the moving blades 11. If the conditions of installation do not allow this torus configuration, the ends of the guide rings 19, . . . , 25 located on the winding-head side can alternatively terminate in a radial plane E (represented by broken lines in FIG. 1).

Figure 2:
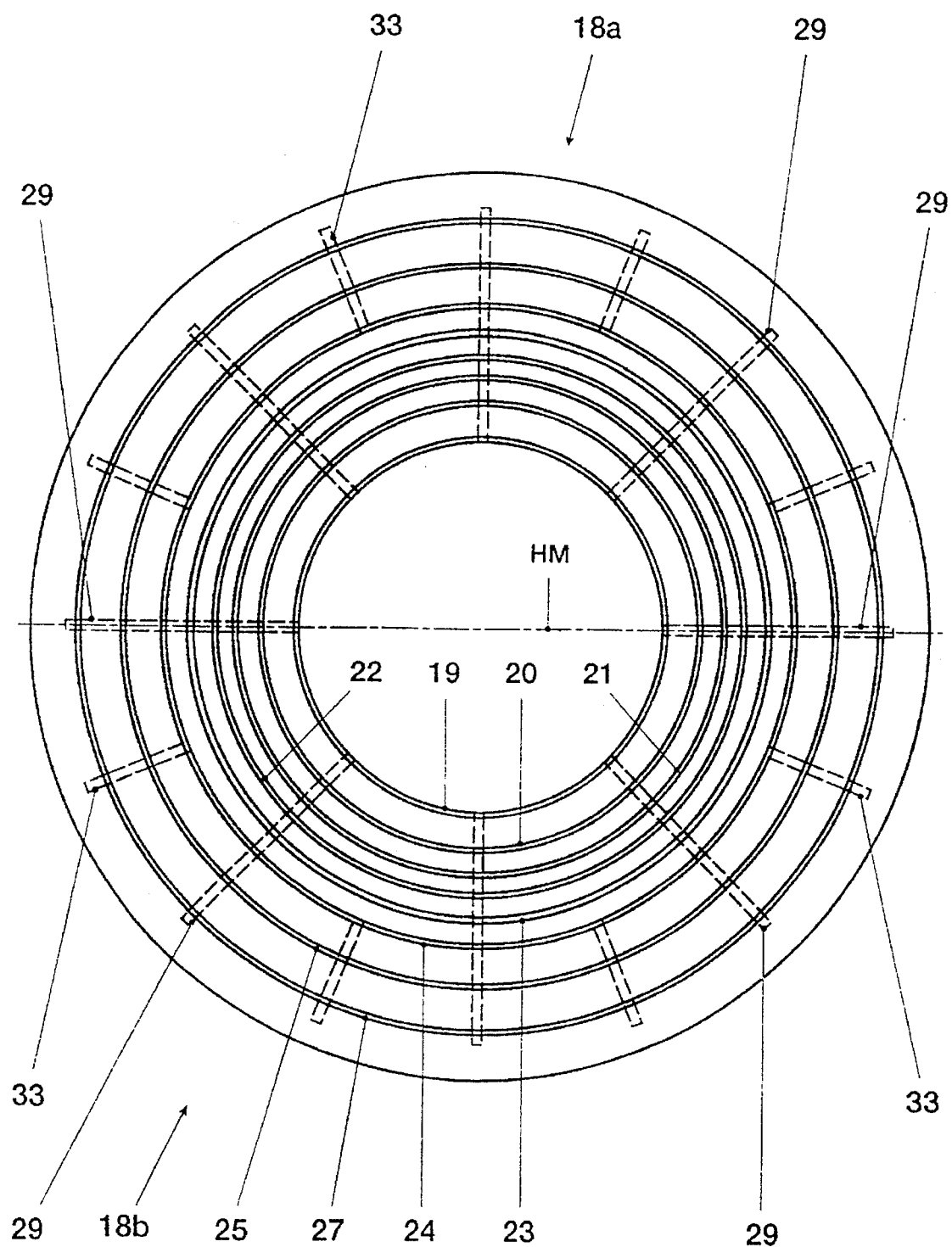
FIG. 2 shows a top view of the gas-guide device assigned to the axial fan.

The individual guide rings 19–25 and the ring part 27 are connected to one another by means of bars 28 and 29 which extend essentially radially and have a circular or oval cross section and which pass through the guide rings 19–25 and also the ring part 27. The uniform distribution of the bars in the circumferential direction can be seen from the top view according to FIG. 2. The guide rings 19–25 and also the ring part 27 as well as the bars 28 and 29 consist of non-magnetic material, preferably or an aluminum alloy. The connection of individual parts to one another in that case is preferably by welding. The guide rings 19–25 as well as the bars 28, 29 can also consist of glass-fiber-reinforced plastic. In that case, adhesive bonding preferably comes under consideration as a connecting technique.

Alternatively or additionally to this, the guide rings 19–25 may be spaced and/or interconnected by guide plates 36 which extend over part or the entire length of the ring-shaped channels K1–K8. To avoid cluttering the drawing, only one guide plate 36 is illustrated in FIG. 1, namely in ring-shaped channel K1.

The profile of the guide plates may be, e.g., circular (see plate 36 in FIG. 5) or twisted (see plate 36' in FIG. 5). The number of guide plates (36, 36') is freely optional, depending on their effects, i.e. their configuration; this number may be greater or less than the number of fan blades 11 on the fan hub 10. The guide plates (36, 36') enable improvement in the pressure conversion in the gas-guide device 18.

The gas-guide device 18 is held by an annular plate 30 which, with filler pieces 31 interposed, is fastened to the partition wall 15 by means of screw bolts 32. At the same time, the axially outer bars 28 and/or the guide plates (36, 36') are welded to the annular plate 30. Furthermore, for stiffening purposes, triangular plates 33 are welded in between the annular plate 30 and the ring part 27. If the conditions of installation permit, the gas-guide device 18 can be mounted to a separate structure as well, for example a seris of radially inward-pointing struts S (represented by broken lines in FIG. 1) which extend from the wall of the housing 14 as far as the annular plate 30.

For centering the gas-guide device 18 relative to the inner end 15a of the partition wall 15, the latter has on its terminal periphery a shoulder 15b which mates with a recess or groove 30a on the inner circumference of the annular plate 30.

Figure 3:
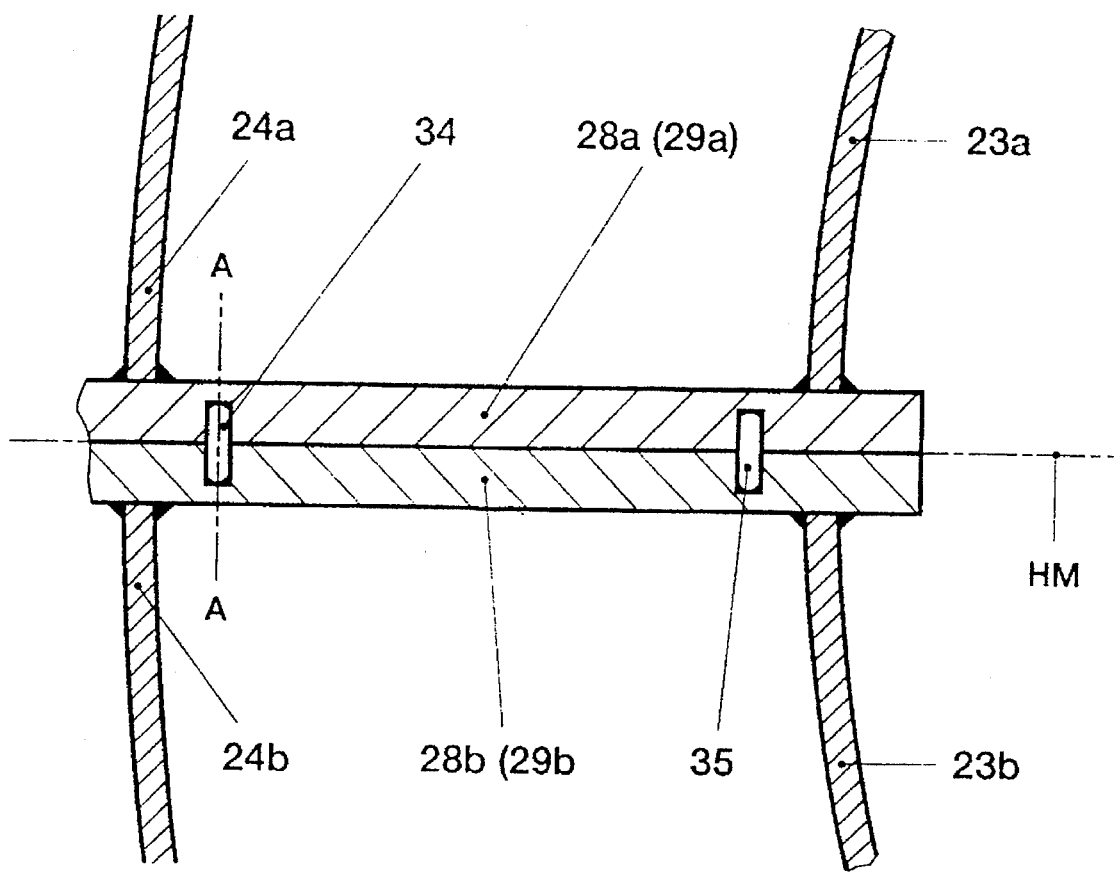
FIG. 3 shows a partial radial section through the gas-guide device at the horizontal separation point.
Figure 4:
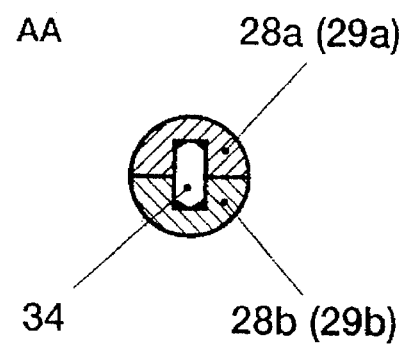
FIG. 4 shows a section through the separation point according to FIG. 3 along the line A—A or the latter.

To enable the gas-guide device 18 to be installed in the machine—it cannot be slipped as a whole over the axial fan 9 for constructive and functional reasons—it is made multi-part, preferably, as in the example, two-part, the two halves being designated by 18a and 18b. The separating faces lie approximately in the horizontal plane of symmetry HM (FIG. 2) of the machine. The separating races pass through the two horizontally extending pairs of bars 28 and 29, of which only the pair of bars 29 can be seen in FIG. 2. The bars are divided there in the longitudinal direction of the bars, and the bar halves of semicircular cross-section are designated by 28a, 28b, and 29a, 29b, respectively. All the guide rings 19–25, the ring part 27 and also the annular plate 30 are made correspondingly two-part, with separating faces along the horizontal plane of symmetry HM. In FIG. 3, there can be seen only two adjacent guide rings 28, 29, the halves of which are designated by 23a, 23b, and 24a, 24b, respectively. These are welded to the bar halves 28a, 28b. Set pins 34, 35 which engage into the two bar halves 28a and 28b secure the mutual position of the two halves 18a, 18b of the gas-guide device. Screw bolts 32 (FIG. 1) hold together the two halves 18a and 18b. Instead of using set pins, the two halves 18a and 18b can also be forcibly held together by screw connection of the bar halves 28a, 28b, and 29a, 29b. However, for reasons of space, this screw connection can take place only at the outer ends of the bar halves.

As a result of the described two-part design of the gas-guide device 18, the latter can be assembled in a simple way: with the partition wall 15 removed, the two halves 18a and 18b can be lowered behind the axial fan 9, secured temporarily there, and finally fastened permanently to the partition wall 15, the cooperation of the tapered mating shoulder 15b at the inner end 15a of the partition wall 15 with the recess or groove 30a of the annular plate 30 ensuring exact centering of the gas-guide device 18.

As a result of the pressure transition brought about by the gas-guide device 18 and the reduction of the outlet losses downstream of the latter in comparison to the hitherto conventional axial outlet provided by the rotor configuration, between 15% and 25% of the pressure losses in the machine can be saved and consequently the cooling effect can be greatly increased.

The invention was illustrated in the foregoing with reference to a gas-cooled turbogenerator. However, it is not restricted to such machine types. It is suitable in all electrical machines with axial fans, insofar as the circumstances of construction and conditions of space allow installation of a gas-guide device of this type. The subsequent installation of such a gas-guide device, for example in a retrofit procedure, can also be considered under particular circumstances, since no modification of the basic structure of the machine is required. Changes are basically necessary only on the fan hub 10 and with regard to the design of the partition wall 15 (present in any case) as a carrier for the gas-guide device 18.

Obviously, numerous modifications and variations of the present invention are possible in light of the above teachings. It is therefore to be understood that within the scope of the appended claims the invention may be practiced otherwise than as specifically described herein.

LIST OF DESIGNATIONS:
1 Rotor
2 Rotor shaft
3 Rotor cover
4 Cover plate
5 Lower bar of stator winding
6 Upper bar of stator winding
7 Lugs ("ear members")
8 Shaft collar on 2
9 Axial fan 10 Hub of 9
11 Moving blades of 9
12 Inflow space of 9
13 End face of 14
14 Machine housing
15 Partition wall
15a Inner end of 15
15b Shoulder on 15a
16 Annular projection having a rounded edge
17 Outflow space of 9 (winding-head space)
18 Gas-guide device
18a,18b Halves of 18
19–25 Guide rings in the form of a cone envelope
23a,23b Halves of 23
24a,24b Halves of 24
26 Conical end of 10
27 Ring part
28,29 Bars
30 Annular plate
30a Recess or groove in 30
31 Filler pieces
32 Screw bolts
33 Triangular reinforcing plates
34,35 Set pins
α Aperture angle of guide rings
E Radial plane
HM Horizontal plane of symmetry—separating plane of 18
$K_1$–$K_8$ Ring-shaped channels
$M_T$ Center point of the generatrix of T
S Struts
T Torus surface segment

What is claimed as new and desired to be secured by Letters Patent of the United States is:

1. A gas-cooled electrical machine with an axial fan at one shaft end, with a rotor and a stator body which is surrounded by a machine housing and which is provided with a stator winding having winding heads on the two end faces of the stator body, with an inflow space of the axial fan, formed essentially by the end wall of the machine housing and by a partition wall between the winding head and said end wall, and with an outflow space of the axial fan, out of which the cooling gas conveyed by the axial fan is fed to the rotor and to the stator body and stator winding, wherein there is provided in the outflow space of the axial fan a gas-guide device which is arranged coaxially relative to the rotor shaft and which comprises a plurality of guide rings in the form of a cone envelope and spaced radially from one another and a ring part likewise in the form of a cone envelope, said rings and ring part being connected to one another and to the machine housing by means of bars extending essentially radially and guide plates, and wherein ring-shaped channels widening continuously in the direction of flow of the cooling gas are formed between respective radially adjacent guide rings.

2. The electrical machine as claimed in claim 1, wherein the hub of the axial fan narrows conically toward the machine interior, in such a way that a ring-shaped channel widening continuously in the direction of flow of the cooling gas is formed between said hub and the guide ring directly adjacent to it.

3. The electrical machine as claimed in claim 1, wherein the guide device is fastened to an annular plate which said annular plate being connected releasably to the partition wall.

4. The electrical machine as claimed in claim 1, wherein the respective lengths of the generatrices of the ring parts in the form of a cone envelope are selected in such a way that their inner ends are located approximately on an imaginary torus surface segment, the generatrix of this torus being a circle the center point of which is located on a circle which is coaxial to the rotor shaft and which passes approximately through the radial center of the moving blades of the axial fan.

5. The electrical machine as claimed in claim 1, wherein the aperture angle of the ring-shaped channels is no larger than 12°.

6. The electrical machine as claimed in claim 1, wherein the gas-guide device consists of two halves which are connected releasably to one another and the separating faces of which extend in the horizontal midplane of the machine.

7. The electrical machine as claimed in claim 1, wherein the guide plates have a circular profile.

8. The electrical machine as claimed in claim 1, wherein the guide plates have a twisted profile.

9. The electrical machine as claimed in claim 2, wherein the guide device is fastened to an annular plate said annular plate being connected releasably to the partition wall.

10. The electrical machine as claimed in claim 2, wherein the respective lengths of the generatrices of the ring parts in the form of a cone envelope are selected in such a way that their inner ends are located approximately on an imaginary torus surface segment, the generatrix of this torus being a circle the center point of which is located on a circle which is coaxial to the rotor shaft and which passes approximately through the radial center of the moving blades of the axial fan.

11. The electrical machine as claimed in claim 3, wherein the respective lengths of the generatrices of the ring parts in the form of a cone envelope are selected in such a way that their inner ends are located approximately on an imaginary torus surface segment, the generatrix of this torus being a circle the center point of which is located on a circle which is coaxial to the rotor shaft and which passes approximately through the radial center of the moving blades of the axial fan.

12. The electrical machine as claimed in claim 2, wherein the aperture angle of the ring-shaped channels is no larger than 12°.

13. The electrical machine as claimed in claim 3, wherein the aperture angle of the ring-shaped channels is no larger than 12°.

14. The electrical machine as claimed in claim 4, wherein the aperture angle of the ring-shaped channels is no larger than 12°.

15. The electrical machine as claimed in claim 2, wherein the gas-guide device consists of two halves which are connected releasably to one another and the separating faces of which extend in the horizontal midplane of the machine.

16. The electrical machine as claimed in claim 3, wherein the gas-guide device consists of two halves which are connected releasably to one another and the separating faces of which extend in the horizontal midplane of the machine.

17. The electrical machine as claimed in claim 4, wherein the gas-guide device consists of two halves which are connected releasably to one another and the separating faces of which extend in the horizontal midplane of the machine.

18. The electrical machine as claimed in claim 5, wherein the gas-guide device consists of two halves which are connected releasably to one another and the separating faces of which extend in the horizontal midplane of the machine.

19. The electrical machine as claimed in claim 2, wherein the guide plates have a circular profile.

20. The electrical machine as claimed in claim 3, wherein the guide plates have a circular profile.

* * * * *